(12) United States Patent
Laue et al.

(10) Patent No.: US 6,360,691 B1
(45) Date of Patent: Mar. 26, 2002

(54) APPARATUS FOR THE AUTOMATIC FEEDING OF ANIMALS, IN PARTICULARY OF CALVES

(75) Inventors: Hans-Joachim Laue, Wehrautal 12, D-24783 Osterrönfeld; Hans-Joachim Holm, Moorweg 6, D-24784 Westerrönfeld, both of (DE)

(73) Assignees: Hans-Joachim Laue; Hans-Joachim Holm, both of (DE)

( * ) Notice: Subject to any disclaimer, the term of this patent is extended or adjusted under 35 U.S.C. 154(b) by 0 days.

(21) Appl. No.: 09/432,685

(22) Filed: Nov. 3, 1999

(30) Foreign Application Priority Data

Nov. 3, 1998 (DE) .......................................... 198 50 536
Mar. 10, 1999 (DE) .......................................... 199 10 452

(51) Int. Cl.$^7$ ................................................. A01K 5/00
(52) U.S. Cl. ................................................. 119/57.92
(58) Field of Search ............................... 119/71, 51.01, 119/51.02, 52.1, 53.5, 54

(56) References Cited

U.S. PATENT DOCUMENTS

| | | | | |
|---|---|---|---|---|
| 3,580,220 A | * | 5/1971 | Cook | 119/71 |
| 3,628,506 A | * | 12/1971 | Glasbergen | 119/71 |
| 3,874,342 A | * | 4/1975 | Kloss | 119/78 |
| 4,291,647 A | * | 9/1981 | Legrain | 119/51.11 |
| 4,803,955 A | * | 2/1989 | Gonsalves | 119/71 |
| 5,067,443 A | * | 11/1991 | Hurnik et al. | 119/71 |
| 5,074,248 A | * | 12/1991 | Loader | 119/74 |

FOREIGN PATENT DOCUMENTS

DE          196 04 199          4/1997

* cited by examiner

Primary Examiner—Thomas Price
(74) Attorney, Agent, or Firm—Vidas, Arrett & Steinkraus

(57) ABSTRACT

An apparatus for the automatic feeding of young animals, in particular of calves, comprising
  a mixing container for the mixing of liquid food, in particular milk powder and water,
  suckling means for the suckling of the animals and
  a connection line for the flow of fluid between the mixing container and the suckling means, the improvement including
  a branch line connected to the connection line, the branch line including a fluid pump.

15 Claims, 2 Drawing Sheets

APPARATUS FOR THE AUTOMATIC FEEDING OF ANIMALS, IN PARTICULARY OF CALVES

The invention refers to an apparatus for the automatic feeding of young animals, in particular of calves.

Feeding automates, e.g. for the breeding of calves, usually have a mixing container into which through dosage means milk powder is supplied and preferably preheated water in order to mix a tempered fresh liquid food for the calves. Such a feeding automate has become known from the German specification DE 196 04 199. Usually in such a mixing container only a certain amount of food is prepared as one or a plurality of calves which visit the feeding automate are only allowed to drink according to a programmed feeding plan. The calves visiting the stand of the automate can be recognized by corresponding control and sensing means. This is generally known. The proportioning of the amount for the individual calf can be also controlled by the control means. For the convenient supply of a calf such automates usually have suckling means which are connected to the mixing container through a connection or suction line.

Some problems are involved with such feeding automates: After some time the apparatus is contaminated through the deposition of liquid food at the inner wall of the mixing container, in the suckling means and the connection line. Food remainder which is not completely drunk by a calf are suckled by not allowed calves so that the feeding plan is disturbed. On the other hand food remainder which is not consumed at all remains in the apparatus. It may perish or may be frozen at night. A further problem exists if the distance between the mixing container and the suckling means is large. In this case the transportation or flowing of liquid food by the suckling of the calf may not be achieved. In particular on farms having older buildings a larger space between the mixing container and the suckling means cannot be avoided. This is above all problematic with particular young calves which have not learned that they could achieve food through suckling at the suckling means.

The invention provides an apparatus for the automatic feeding of calves which facilitates the cleaning, supports the conveyance of food from the mixing container to the suckling means, facilitates the feeding of particular young calves and/or allows the non-provision of food to a calf not authorized.

The apparatus according to the invention for the automatic feeding of calves includes a mixing container for the mixing of liquid food, in particular of milk powder and water. The food is preferably proportionated and heated up to a given temperature. The mixed food flows through a connection line from the mixing container to the suckling means where the calf may suckle the food. The connection line has a branch line, preferably adjacent to the suckling means to which a fluid pump is connected.

With such an apparatus different modes of operation are possible. For such operations it is preferred to provide a controllable valve, preferably an electromagnetic actuated valve between the T-portion and the suckling means. This valve is controlled by the control means associated with the feeding automate. Such control means are already disclosed by the mentioned German patent specification DE 196 04 199. If a calf enters a stand where the suckling means are located the calf is recognized by the control means, and the control means causes the feeding automate to provide a predetermined amount of liquid food. This food then can be suckled by the calf through the suckling means in that the food flows through the connection line to the suckling means. The branch line which includes the fluid pump and a vale may be upstream of the pump which is closed during the suckling of the calf. However, such a valve may be not necessary if the resistance in this branch line is sufficient that no air is suckled by the calf through the branch line and the pump.

However, it may be that the calf is not strong enough to overcome a long distance between the mixing container and the suckling means. In this case the pump may be driven by a suitable motor in order to convey the liquid food from the mixing container to the suckling means. However, in this case the controllable valve is shut-off. As the volume of the connection line between the mixing container and the T-portion of the lines is known and also the displacement volume of the pump the pump is switched on only for a predetermined time or predetermined number of revolutions so that only a predetermined amount of food is sucked into the connection line and occasionally in the branch line. Thereafter, the operation of the pump or of the motor driving the pump is terminated by the control means. The control means open the shut-off valve so that now the calf may easily suckle the food through the suckling means. In order to support the suckling by the calf or to stimulate the calf after the operation described above the pump may be reversed. In this case some liquid food in the branch line is conveyed back. A check valve downstream of the T-portion of the lines is then closed, and the control valve is opened so that some food may be pressed out of the suckling means. This can be recognized by the calf and stimulates the calf to make use of the suckling means.

The described system may be also used for a second mode, i.e. for the cleaning of the mixing container and the connection line. For the cleaning purpose the control means initiates the supply of hot water into the mixing container and the supply of cleaning means in order to clean the mixing container. Such a cleaning may be supported by suitable agitating means in the mixing container. Thereafter the fluid pump in the branch line may be again driven by the motor while the shut-off valve adjacent to the suckling means is shut by the control means. Thus, the pump conveys cleaning fluid from the mixing container through the connection line and through the pump to an outlet. This outlet may be formed by a storage line which is connected to the pressure outlet of the pump and which may be opened to atmosphere. It is understood that a collection container or the like is associated with the outlet in order to collect the cleaning liquid. The closing of the valve, furthermore, prevents a calf from suckling cleaning liquid through the suckling means.

A third mode of the system described prevents liquid food in the connection lines from being frozen. A temperature sensor is associated with the feeding automate or the suckling station. The sensor is connected to the control means. If the outdoor temperature is below a predetermined value, preferably below 0° C., the control means initiates the feeding of hot water into the mixing container. It is only necessary, that a small amount of water is injected into the mixing container. The hot water is then conveyed by the fluid pump through the connection line and the storage line, possibly. The feeding of hot water through the connection line leads to a heating of the connection line and prevents that food in the line become frozen. Such an operation may be repeated from time to time in dependence of the measured temperature. It is clear that the intervals between the feeding of hot water through the connection lines become smaller with decreasing temperatures. Also in case of this mode the shut-off valve adjacent to the suckling means is shut. In order to avoid that the suckling means become frozen additional heating means controlled by a temperature sensor may be integrated in the suckling means. Such means, therefore, maintain the operation of the feeding automate also with temperatures below 0° C.

As already mentioned above, the apparatus according to the invention has a plurality of advantages: By means of the pump a relatively long connection line between the mixing container and the suckling means can be filled up with food without the calf being forced to suckle the food through the complete connection line. If the calf has not consumed total of the liquid food the remainder can be pumped out of the connection line. Thus, the remainder is not perished and does not contaminate the line. Furthermore, a non-authorized calf may not drink the remainder of the food.

Usually, the mixing container is cleaned after a mixing process. Thus, the pump may convey warm or hot water through the connection line in order to clean to it and to avoid that remainder of the liquid food dries in the connection line. The warm water may remain in the connection line until a further calf visits the suckling station. The newly mixed food is then sucked by the pump through the connection line while contemporarily the warm water is removed. The warm water in the line has on the one side the effect that food remainder is not dried and on the other side that the connection line is pre-heated.

For the cleaning of the connection line by means of the pump pre-cleaning and past-cleaning liquids can be conveyed through the connection line which liquids being known to be used for the cleaning of the mixing container. Such measure makes a separate outlet valve unnecessary which usually is used for the outlet of cleaning fluids from the mixing container. Preferably, the suction force of the pump is stronger than that of the calf. If a calf suckles during the cleaning process it should not be in a position to suckle cleaning fluid. Preferably, the fluid pump is a displacement pump, e.g. a hose pump.

Preferably, the pump may be reversed. Upon reversal the pump may urge air into the connection line.

The feeding of air through the connection line may also be used for the agitation of cleaning fluid in the mixing container.

If a non-authorized calf appears at the suckling means the air pressed into the connection line effects that the food within the connection line is conveyed back to the mixing container and does not reach the calf. This allow the elimination of a valve which nominally is used to prevent non-authorized calves to obtain food.

Preferably, the pressure side of the fluid pump is connected with a storage line. The storage line may be a line portion, preferably bent upwardly at the end and has relatively small lengths, e.g. 1 m. The free end of the storage line is open to atmosphere.

As being open to atmosphere the pump may press air into the connection line upon reversal. The storage line has the additional advantages: If a particularly young calf appears at the suckling means the calf may be animated to drink if liquid food drops out of the suckling means. This can be achieved by the apparatus according to the invention in that the pump sucks liquid food through the connection line into the storage line. After this the control means reverse the pump so that the food is pressed back into the connection line. Due to the higher flow resistance of the connection line or by means of a check valve the liquid food is pressed into the suckling means and may drop therefrom. This animates a young calf.

Also with respect to the described cleaning procedure the storage line has the advantage in that for example warm cleaning water is not only conveyed through the connection line, rather is sucked also into the storage line. A reversal of the pump presses the cleaning liquid back into the connection line. Thus, an intermittent rinsing and cleaning of the lines and of the pump can be achieved which results in a particular careful cleaning process. A portion of the water is also pressed out of the suckling means so that also the suckling means is cleaned.

In an embodiment of the invention the fluid pump may be a jet pump. The jet pump is also connected to the branch line. The jet pump is connected with a pressure line which extends parallel to the connection or suction line. The pressure line is connected with a source for cold water.

The relatively thin suction line generates in the jet pump a flow of high velocity with relatively high pressure so that a sufficient pumping action is achieved in order to suck cleaning liquid from the mixing container through the connection or suction line and through the branch line. In order to avoid a sucking of air through the suckling means or that an animal sucks cleaning fluid a valve may be provided adjacent to the suckling means which may be a check valve or a controlled valve. If the valve is a check valve it must be taken care that the suction pressure through the jet pump is higher than the suction force by the animal.

The expense for such an apparatus is a minimum. The pressure line is relatively thin. It can be extended through a protection tube in common with the suction or connection line. This has the truster advantage that the temperature prevailing in the suction line is also transferred to the water in the pressure line. By this it can be avoided that a icing-up occurs. To this purpose the control means provides a temperature sensor. In case of minus temperatures (in Celsius) the control means effects that from time to time hot water is feeded into the mixing container and sucked through the jet pump. By this a freezing of the suction line is prevent and of the pressure line as well. The heat generated in the suction line is transferred to the pressure line. The time intervals between such heating steps can be changed, e.g. in that they become smaller with decreasing temperatures.

Two embodiment examples of the invention are subsequently described along accompanying drawings.

Figure 1:
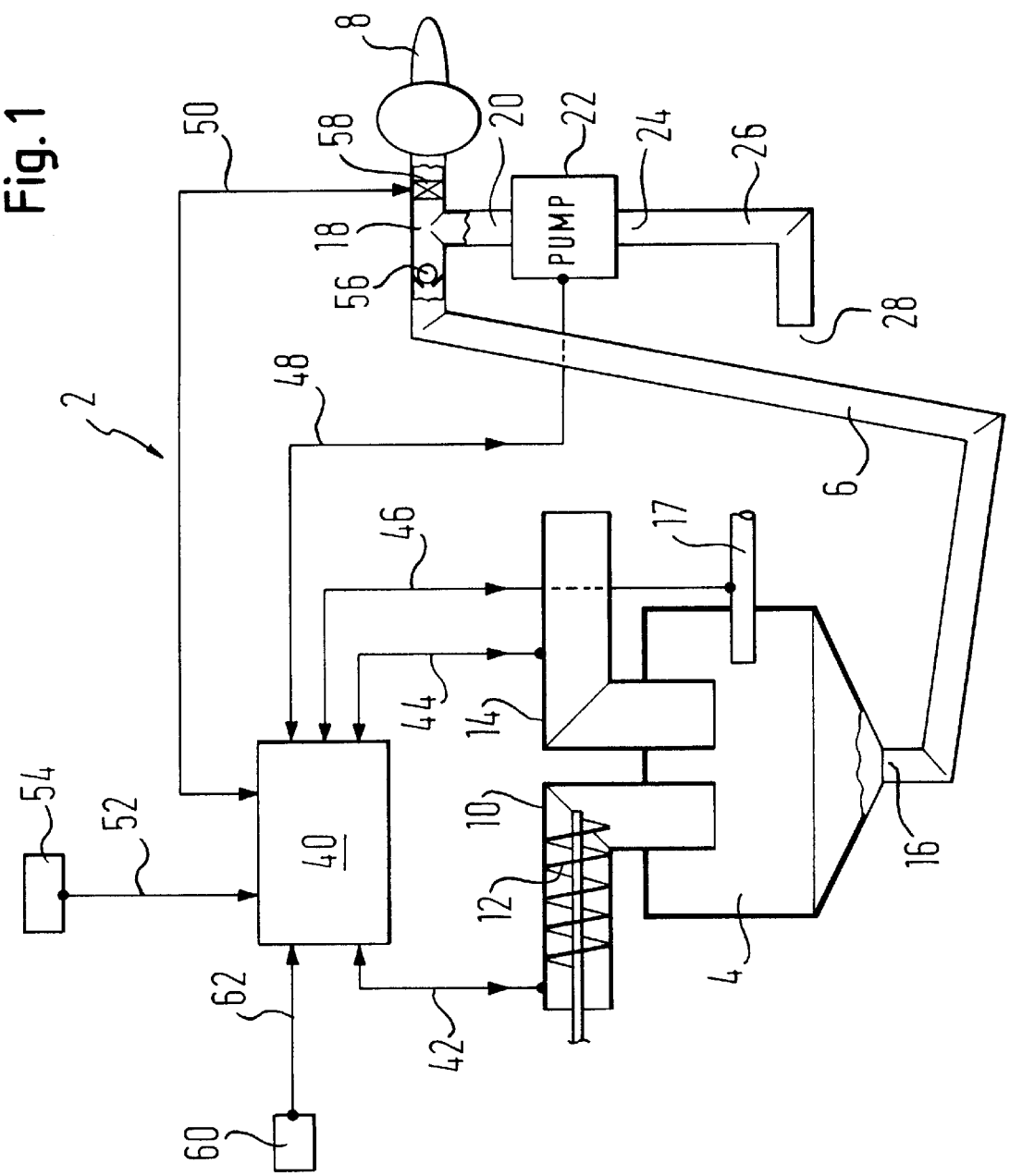
FIG. 1 shows diagrammatically an apparatus according to the invention.

An automate 2 comprises a mixing container 4 which is connected with suckling means 8 in a suckling station (not shown) through a connection line 6. Two feeding lines 10, 14 are located above the mixing container 4. The left feeding line 10 is connected to a worm conveyor 12 which conveys a proportioned amount of milk powder into the mixing container 4. The right feeding line conveys a proportioned and tempered amount of water into the mixing container 4. In the mixing container a liquid food is prepared out of the components by means not illustrated. A run-off opening 16 is positioned at the lowest point of the mixing container so that the fresh mixed liquid food may flow into the connection line 6. At the end of the relatively long connection line 6 just in front of the suckling means 8 a T-portion 18 is provided for a branch line which is connected to the suction end 20 of a fluid pump 22. The pump 22 can support the conveyance of liquid food through the connection line 6 as already mentioned. A storage line 26 is connected to the pressure side 24 of the fluid pump 22 and may have an upwardly bent end portion which is connected to atmosphere at 28.

By means of control means 40 the pump may be reversed as already described above in order to press air into the connection line 6 or the suckling means 8, respectively, or as also described to press liquid food back which has been pumped priorly into the storage line. By a simple check valve 56 in the suction or connection line 6 the amount of air flowing to the suckling means may be increased and thus also the amount of food (learning of young calves). The check valve may he provided occasionally. In case of a check valve it is not possible to convey air under pressure into the mixing container 4 for agitating purposes. In this case the check valve 56 may be also substituted by a control valve which is controlled by control means 40.

As already mentioned control means 40 is provided for the operation of the feeding automate 2. By control lines 42 and 44 the feeding of the components of the liquid food can be controlled by opening or closing of the feeding lines 10 and 14. The feeding of cleaning liquid or cleaning medium through line 17 is controlled through control line 46.

The operation of the pump 22 for a predetermined time or number of revolutions and a reversal of the pump or the motor therefore, respectively, is controlled by control means 40 through control line 48.

A electromagnetic actuated valve 58 is arranged between suckling means 8 and T-portion 18. The actuation of valve 58 is carried out through control line 50.

The control means 40 is also connected through known recognizing means 54 recognizing the individual calves. The recognizing means is connected through line 52 with the control means. In the control means different programs are stored which can be also changed for the operation of the feeding automate in dependence of the calf recognized. For example valve 58 can be closed if a calf appears at the suckling means 8 which is not authorized.

It is also possible as already described above, to support young calves during their trial to drink.

Additionally, control means 40 is connected to a temperature sensor 60 which measures the ambient temperature adjacent connection line 6. In dependence of the measured temperature control means 40 may control the supply of warm water through feeding line 14. In particular at temperature degrees below 0° C. the control means 40 may close valve 58 from time to time and cause pump 22 to convey warm water through connection line 6.

Figure 2:
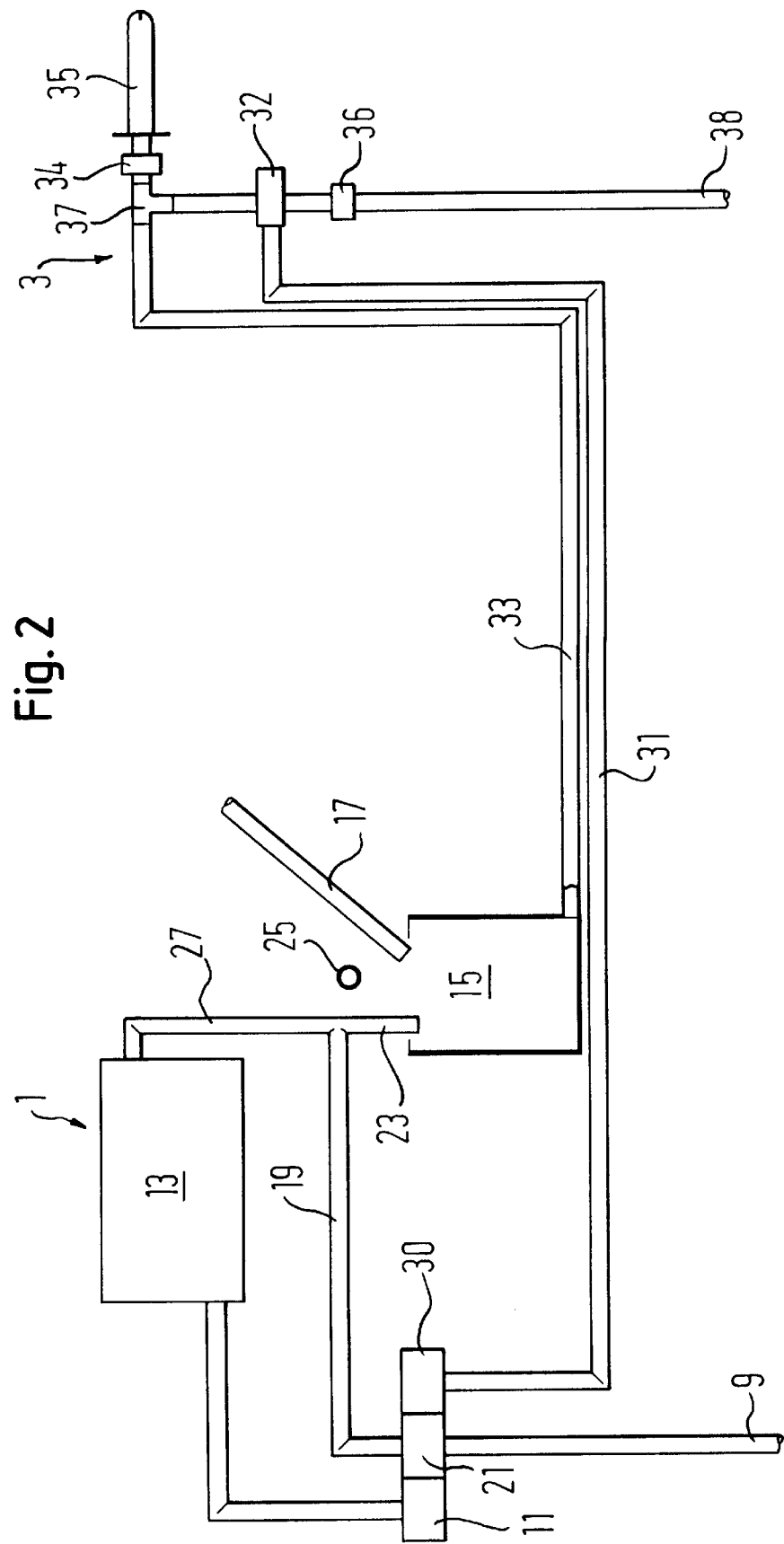
FIG. 2 shows diagrammatically a further embodiment of the invention.

In FIG. 2 a mixing station 1 and a demanding station 3 are provided. The mixing station 1 has a mixing container 15. A feeding line 23 for water is located at the upper end of the mixing container 15. The feeding line 23 is connected with a water heater 13 which through a valve 11 is also connected with a feeding line 9 for cold water. The line 27 between the heater 13 and the feeding line 23 is connected to a line 19 which through a valve 21 is connected to a source for cold water. A feeding line 25 for dry food is associated with the mixing container 15 as well as a feeding line 17 for cleaning fluid.

The demanding station 3 has suckling means 35 which is connected to the mixing container 15 through a suction line 33 which may have a length of 2 or more meters.

Adjacent the suckling means 35 a T-portion 37 is provided for the connection to a branch line 38. A valve 34 is provided between the T-portion 37 and the suckling means 35. Valve 34 may be for example a check valve. A jet pump 32 is connected to the branch line 38. The details of the jet pump are not illustrated as already known generally. Downstream of the jet pump 32 a shut-off valve 36 is located in line 38. Through a relatively thin pressure line 31 the jet pump 32 is connected to the source 9 for cold water through a valve 30.

If valve 30 is opened cold water under pressure, e.g. 4 bar, flows to a jet pump 32 which on the upstream side generates a suction pressure whereby liquid is sucked from the mixing container 15 through suction line 33. The check valve 34 is closed and dimensioned such that upon a suckling at suckling means 35 by a young animal it is not opened. If cleaning liquid is supplied into the mixing container 15 through feeding line 17 it can be removed through branch line 38 as described. Thus, not only mixing container 15 is cleaned, rather suction line 33, too.

Both lines 33, 31 are extending in contact which each other, e.g. through a common protection tube (not shown) so that a heat transfer can take place, if for example mixing container 15 is filled with hot water from time to time and hot water is pumped by jet pump 32, the heat developed in suction line 33 is transferred to pressure line 31. This is to avoid that the system is iced up at lower temperatures.

What is claimed is:

1. An apparatus for the automatic feeding of young animals, in particular of calves, comprising:

a mixing container for the mixing of liquid food, in particular milk powder and water;

suckling means for the suckling of the animals;

a connection line for the flow of fluid between the mixing container and the suckling means;

a T-portion connected to the connection line adjacent to the suckling means, the T-portion also being connected to a branch line, the branch line being connected to the suction end of a fluid pump, the fluid pump having first and second modes;

the pump in a first mode conveying the liquid food from the mixing container to the suckling means, and in a second mode the pump conveying cleaning fluid from the mixing container through the connection line to an outlet.

2. The apparatus of claim 1, wherein the fluid pump is a displacement pump.

3. The apparatus of claim 1, wherein the branch line is connected to the connection line adjacent to the suckling means.

4. The apparatus of claim 1, wherein the suction direction of the pump can be reversed.

5. The apparatus of claim 4, wherein the pump pumps into the connection line if being reversed.

6. The apparatus of claim 1, wherein the pressure side or outlet of the fluid pump is connected to a storage line.

7. The apparatus of claim 1, wherein the functions of the pump are controlled by control means which also control the operation of the feeding apparatus.

8. The apparatus of claim 1, wherein the fluid pump is a jet pump.

9. An apparatus for the automatic feeding of young animals, in particular of calves, comprising:

a mixing container for the mixing of liquid food, in particular milk powder and water;

suckling means for the suckling of the animals;

a suction line for the flow of fluid between the mixing container and the suckling means;

adjacent to the suckling means a branch line is connected to the suction line, and wherein a valve is located between the branch line and the suckling means, a jet pump is located in the branch line which is connected to a pressure line extending parallel to the suction line, the pressure line being connected to a cold water source thorough a valve controlled by control means.

10. The apparatus of claim 9, wherein the pressure line is arranged immediately adjacent to the suction line for the heat transfer from the suction line to the pressure line, both lines preferably being both located in a protection tube.

11. The apparatus of claim 9, wherein the valve adjacent to the suckling means is a check valve.

12. The apparatus of claim 11, wherein a shut-off valve controllable through the control means is connected downstream of the jet pump.

13. The apparatus of claim 12, wherein the intervals between the suction of hot water decrease with decreasing temperatures.

14. The apparatus of claim 9, wherein the valve adjacent to the suckling means is a controllable electromagnetic valve.

15. The apparatus of claim 9, wherein the control means is connected to a temperature sensor, the control means initiating the supply of hot water into the mixing container from time to time, with the hot water being sucked through the suction line by means of the jet pump.

* * * * *